April 14, 1970   J. R. DENNER   3,506,352
PHOTOGRAPHIC APPARATUS AND THEIR CALIBRATION
Filed Sept. 19, 1967   4 Sheets-Sheet 1

Inventor

April 14, 1970  J. R. DENNER  3,506,352
PHOTOGRAPHIC APPARATUS AND THEIR CALIBRATION
Filed Sept. 19, 1967  4 Sheets-Sheet 4

Inventor
By
Attorney

United States Patent Office 3,506,352
Patented Apr. 14, 1970

3,506,352
PHOTOGRAPHIC APPARATUS AND THEIR CALIBRATION
James Railton Denner, Somerset, England, assignor to W. H. Howson, Limited, Leeds, England, a company of Great Britain
Filed Sept. 19, 1967, Ser. No. 668,773
Claims priority, application Great Britain, Sept. 23, 1966, 42,488/66
Int. Cl. G03b 27/76; G05d 25/00
U.S. Cl. 355—68                    10 Claims

ABSTRACT OF THE DISCLOSURE

In photographic apparatus an image is projected and exposed on photographic material on a support surface by a first light source of adjustable intensity. A light-sensitive photo-resistive electric cell, removably placed on the support for receiving light from the first source, has a current sensitive instrument in circuit with it to indicate the intensity of light received by it, and means is provided to vary the resistance of the latter circuit for calibrating the current sensitive element. A second light source of adjustable intensity is adapted to direct light to the cell, when the first light source is shut off, for use in calibrating the current sensitive instrument.

BACKGROUND

The present invention relates to photographic apparatus, i.e. enlargers scanners and cameras, and methods for operating them. The enlargers scanners and cameras are those which are used in graphic arts; that is to say that they are used in the preparation of printing matrices from photographs and other originals. The aims in graphic arts to enable the reproduction of the photographs or other originals (whether monochrome or coloured) in print with accurate gradation of tone, good texture and true colour values.

In graphic arts, enlargers and cameras are in many cases interchangeable in their use; each involves the preparation of a photograph of an object and in each case the same considerations apply in attempting to ensure the faithfulness of that photographic record. Therefore in this specification, wherever the context allows, "camera" or "scanner" may be read for "enlarger" and "focal plane" for "easel." The "light source" for a camera is the object being photographed and may include flash illumination lamps for giving a flash exposure, as is well known in graphic arts.

It can be said that in general in the early stages of the development of this industry results were achieved which depended upon the skill of the operator of the various processes involved. But with the development of this field it is becoming increasingly necessary for intuitive methods to be replaced by ones which can be strictly objectively measured and which can thereby give accurate results and yet permit them to be produced in a more routine manner. In step with this, the apparatus involved has been refined and elaborated so that the operating procedures themselves can be of a simple nature and can be performed by a semi-skilled man.

Certain of these developments, made by the present inventor, are directly relevant to the present invention and a short summary of them will be given here.

It should first be explained, however, that when exposing though half-tone screens in an enlarger or camera the usual practice is to give at least two exposures, one, through the screen and the image being copied, being called the main exposure and the other, and overall uniform exposure through the screen, being called the flash exposure although it is not necessarily of brief duration, and may be given for the same length of time as the main exposure. The flash exposure is used to condition the record produced by controlling the contrast range it contains. This applies to half-tone work in monochrome or colour-separation work.

Depending on the characteristics of the screen and/or the equipment it will sometimes be necessary to give a highlight exposure known as a "no screen" exposure; but this has no relevance to the present invention.

CROSS REFERENCES

U.S. Ser. No. 624,897 discusses the problems involved in using a photo-sensitive cell and in particular a photo-resistive cell in measuring light intensity received at the easel of an enlarger or in the focal plane of a camera. To eliminate the difficulties arising from the "rise-time" of these cells (the time which they need to settle when exposed to light), which can cause either delays, or incorrect readings on a meter powered from such cells, the present inventor has provided in a photographic apparatus a light-source specifically for illuminating at a controlled intensity the photo-sensitive cell while that cell is not being used in determining an exposure light value. The specifically provided light source may be actually within the probe which houses the cell or may be placed on the enlarger in a position to illuminate the cell when the probe is not in a working position. This co-pending specification discloses that the intensity of the light given from that specifically provided light source may be varied, so as to approximate to that expected when the probe is used, but it does not disclose any adjustability in the output circuit of the cell; thus the cell gave a reading which was determined only by its own particular characteristics and by the amount of light falling on it.

U.S. Ser. No. 621,264 is of less essential importance to the present invention but is concerned with the problems of obtaining identity of colour temperature as between the light sources which are giving the flash and the main exposures in half-tone work, and solves this problem by in fact dividing light from a single light-source into parts to provide both exposures; for example in an enlarger part of the light from that source passing through the transparency and part by-passing the transparency; with means of adjusting the ratio of the two parts which is received at the easel of the enlarger or focal plane of the camera.

In U. S. Ser. No. 629,055 the inventor has shown means for and methods of accurately controlling the ratio between and the absolute values of flash and main exposure light as received at an easel or focal plane. This involves the use of two probes, one in the highlight and one in a shadow position of the image, the probes remaining stationary in their position while and adjustment is made, the adjustment providing two adjustment and at least one re-adjustment steps are carried out with both flash and main lights illuminating the easel or focal plane: they are carried out alternately on main and flash exposure lights, starting with the main light, until desired values are exactly reached.

BACKGROUND OF THE INVENTION

The present invention is a development of the invention of U.S. Ser. No. 624,897 and provides means for and method of determining how much light shall be given to the photographic material being exposed from the enlarger light-source or sources by a preliminary calibrating adjustment which does not, however, involve switching on that light-source specially every time an alteration is being made to set up or adjust the calibration of the enlarger. The present invention essentially requires that each photo-sensitive cell which is to be used shall be capable of being illuminated by a specifically provided and adjustable light source. The invention has the further advantage that its procedures are such that there is produced in those specially provided light-sources an intensity of illumination on the cells that is exactly equal to that which is desired at the easel of the enlarger or focal plane of the camera. Hence, there should be almost no "rise-time" when the probes are used actually for reading light values: If automatic means are provided to switch off the probe lights whenever the main light goes on, and vice versa, any possibility of the cell losing its conditioning as a result of delay is avoided.

This is achieved by providing in a photographic apparatus having a light-source for making exposures and at least one light-sensitive probe, the photo-electric cell of each light-sensitive probe being connected electrically in a circuit including a current-sensitive element and at least one adjustable element for adjusting the circuit, a separate source of light for illuminating each cell when not illuminated by the first light-source, and means for adjusting the strength with which the separate light source can illuminate the cell. The adjustability in the circuit of the cell is used in calibrating the current-sensitive element, in a method according to the invention, before any working exposure is made, so that when it is actually desired to make a working exposure, the separate light source is adjusted so that the current-sensitive element reaches that condition to which it was previously calibrated; if this is done the exposure light sources can easily be correctly set to give, after exposure of the photographic material for a predetermined time and a standard development process of that material, a desired density on the finished photographic material.

The method according to the invention is a method for calibrating a current-sensitive element relative to light intensity at the easel of a photographic enlarger or at the focal plane of a camera including the steps of placing a photo-electric cell in a current-sensitive circuit at a desired position in an image projected onto the easel of focal plane by the exposure light source, adjusting the amount of light received at the easel or focal plane for a pre-determined time, subjecting the photographic material to a standard development process, determining the density of the developed photographic material at the same desired position, correlating the found density with a desired density and if the two are different, exposing the photo-electric cell to a separate source of light of which the intensity is controllable independently of that of the exposure light source, adjusting that separate light source until the current given by the photo-electric cell as determined by a current-sensitive element in the current-sensitive circuit corresponds exactly to the desired amount and, while the separate light source is left on in its adjusted condition to illuminate the photo-electric cell, adjusting means in the current-sensitive circuit until this circuit is in a condition corresponding not to the desired condition but to the reading actually obtained on the developed material.

Preferably the current-sensitive element of the photo-electric cell circuit is an ammeter, but it may be part of a servo mechanism, e.g. part of a bridge or a current amplifier powering a relay.

The adjustment of this circuit will preferably be accomplished by a variable resistance in the circuit.

The invention includes a process of producing developed photographic material in which, after carrying out the steps detailed above, probes are positioned in the desired positions in the image, and the light at the easel derived from the exposure light source is adjusted so that the desired reading is obtained, photographic material is exposed to that light for a pre-determined time, and a standard development procedure is carried out on that photographic material.

DESCRIPTION OF DRAWINGS AND OF A PARTICULAR EMBODIMENT

A particular embodiment of the invention and a method of carrying it out will now be described with reference to the accompanying drawings wherein.

Figure 1:
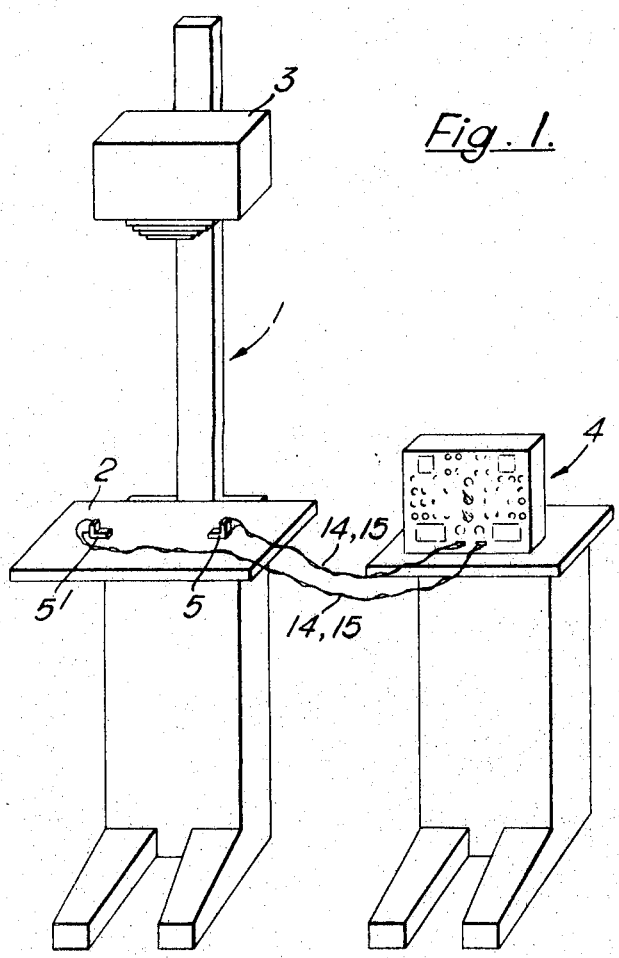
FIGURE 1 is a perspective diagrammatic view of an enlarger.

FIGURE 1 shows diagrammatically an enlarger 1 for use in graphic arts which has an easel 2, and a lightbox 3 containing a light source. The lightbox 3 may include means according to my co-pending U.S. application No. 621,264 for dividing the light from a single source so as to provide both main and flash exposure lights, or alternatively a separate light source or sources may be provided for giving the flash exposure light. The lightbox 3 contains a transparency holder, heat filter, condenser and objective lenses, as are usual in enlargers, to cause the accurate projection of an image from the transparency onto the easel 2.

The easel 2 will be provided with means (not shown) for positioning and removing a half-tone screen above photographic materials held on the easel, in a manner also known and conventional in this art.

With minimal adaption, the enlarger 1 can be used as a horizontal-plane camera.

Means are provided for controlling the intensity at which light from the single light source or all the light sources is received at the easel. These means may be means for controlling the electric power applied to those light sources or may be in the form of diaphragms or other shutter-like obstruction in the light path. If main and flash exposures are derived from the same source then it is preferred to control the power supply of that source, since variations in intensity of the light source will affect equally the colour temperature of the main and the flash exposure light. But if the main and flash exposure lights are derived from different sources then physical control of the light arriving at the easel, for example, by a diaphragm is preferred. Then, the light sources will be able to be run at fixed colour temperatures.

In the embodiment about to be described however, a single light source supplies both main and flash exposures in the manner described and claimed in my said copending application No. 621,264 and a single electrical control for this light source will be described; the means for adjusting the ratio of division of light from this source between main and flash exposures is also as described in that co-pending application.

In conjunction with the enlarger there is shown a control box 4 which has controls to be handled by the operator of the enlarger and which is linked electrically to the enlarger and contains the circuitry which will be described.

The control box 4 is arranged to be accessible to the operator for operation while he is sitting in front of the easel of the enlarger.

Figure 4:
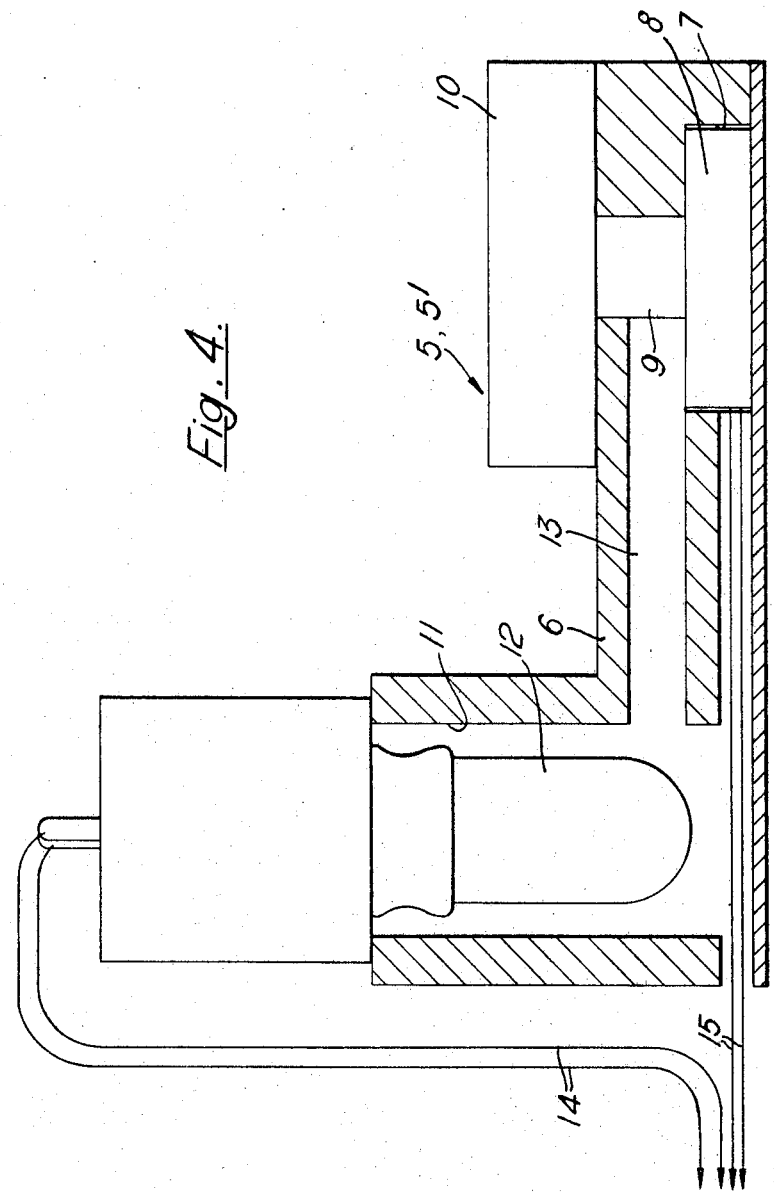
FIGURE 4 shows in sectional view one form of probe.

Two light-sensitive probes 5, 5' are connected to the control panel by flexible leads so that they are freely translatable over the easel of the enlarger and can be placed at any desired position on it. In the present embodiment the probes are of the type disclosed in my co-pending U.S. patent application No. 624,897 in which specifically provided light sources are provided within the housing of the probes themselves, and a very brief description of one such probe will be given with reference to FIGURE 4. A body 6 of the probe has two compartments, one, 7, containing a light-sensitive cell 8 preferably of the type in which resistance varies with the intensity of the light impinging on the cell, and a hole 9 permits light to fall on the cell from above the probe, a heat filter 10 being placed above the hole 9. The other compartment 11 of the probe contains a low wattage low voltage electric light bulb 12. A channel 13 leads between the compartments 11 and 7 and allows light from the bulb 12 to impinge on the light cell 8.

Figure 2:
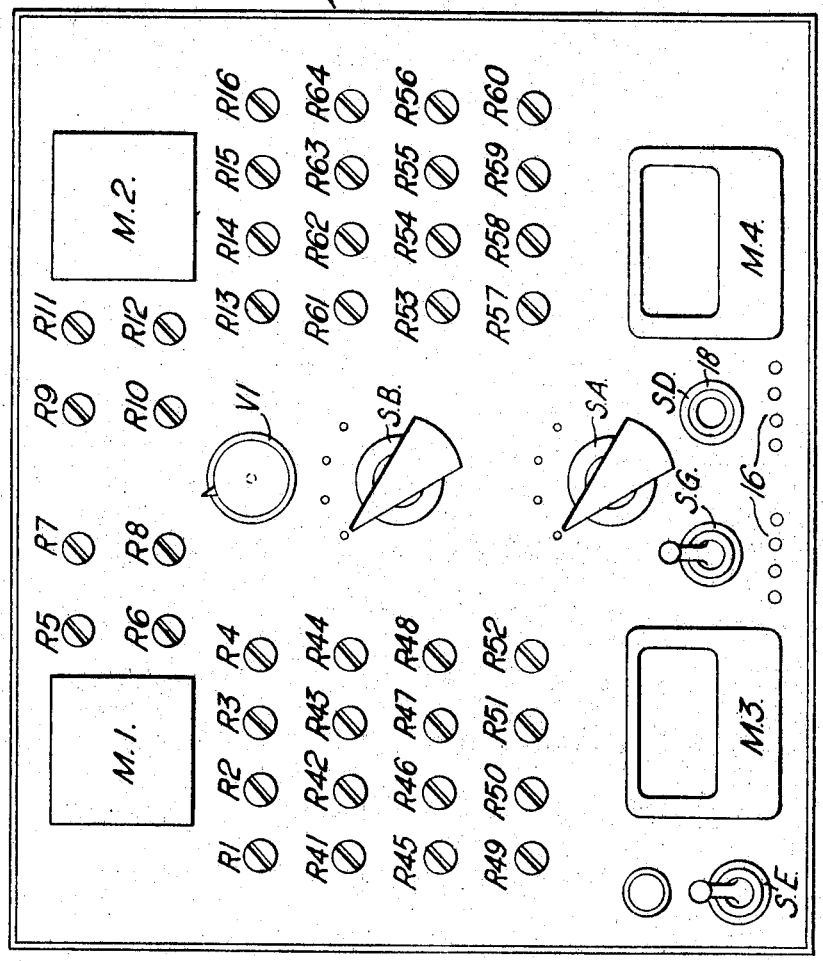
FIGURE 2 shows one arrangement of a control panel for the enlarger.

Power for the light 12 is brought in by leads 14, and leads 15 are connected to the light-sensitive cell 8. Leads 14, 15 end in jacks which are to be inserted in sockets 16 in the control box 4 (FIGURE 2).

Two probes 5, 5' are provided, the probe 5 for use in the highlight position of the image, the probe 5' for use in the shadow position of that image in the manner, for example, disclosed in my co-pending U.S. application No. 629,055.

The invention may however be embodied in an enlarger or camera with a single probe used for determination of highlight or shadow light values in which case appropriately simplified circuitry will be involved: such an enlarger may be used also for determining both values successively, one at a time.

Figure 3:
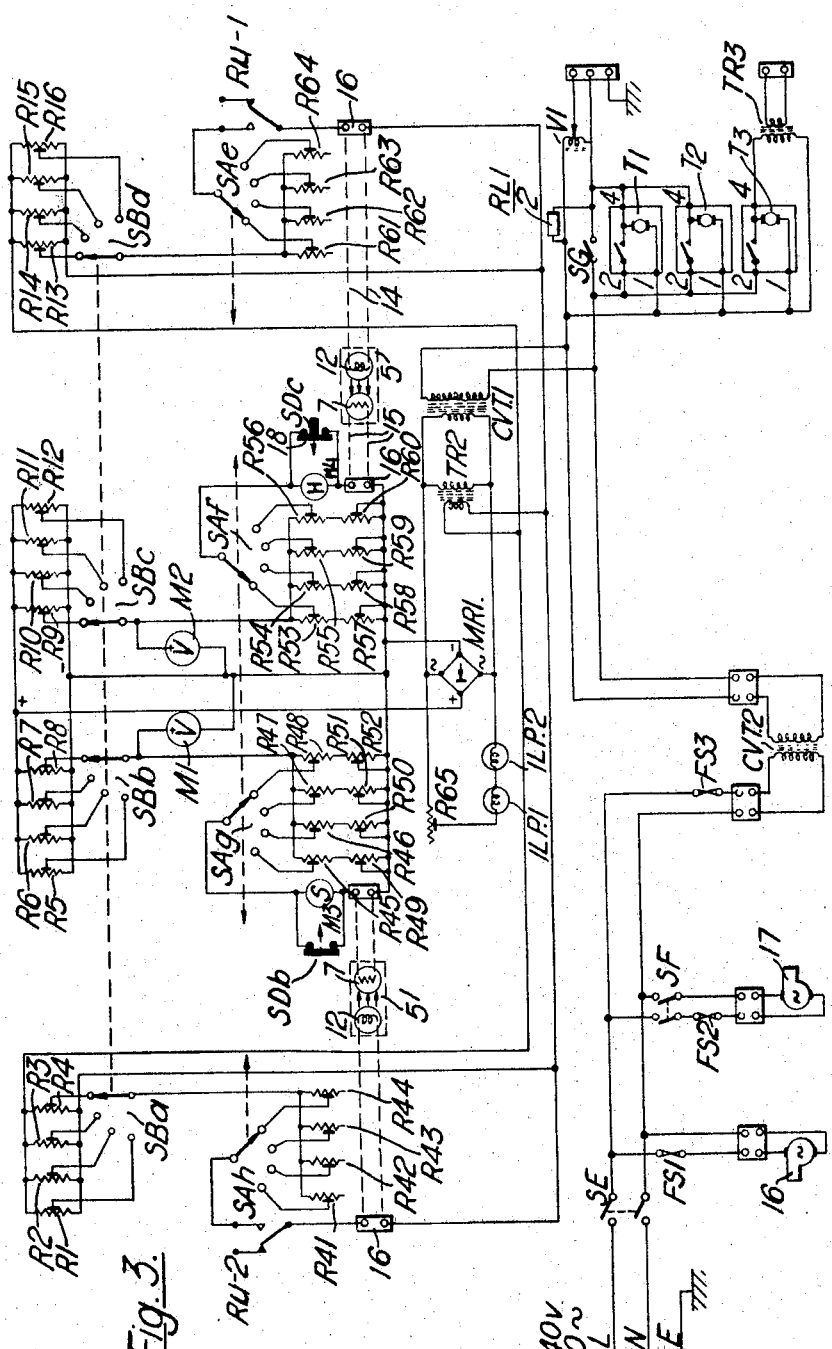
FIGURE 3 is an electrical circuit diagram.

The circuitry shown in FIGURE 3 shows that used when two probes are involved as is preferable in colour separation work. The probes 5, 5' are shown in the circuit and the circuits associated with each probe 5 are identical.

The circuit diagram will be traced through from its bottom left-hand corner as seen in FIGURE 3. A mains supply of AC current is taken through a main on-off switch SE to feed firstly a blower motor 16 for cooling the enlarger, secondly, through a switch SF, a vacuum pump 17 optionally provided in case it should be desired to use, in a manner known per se, reduced air pressure for holding photographic material at the easel of the enlarger, and thirdly a constant voltage transformer CVT2, the output side of which feeds through a variable transformer V1 and a shunt switch SG the main light source of the enlarger. The mains supply is protected by fuses FS1, FS2 and FS3. When the shunt switch SG is open motor driven timers T1 and T2 are in circuit and can apply voltage across the variable transformer V1.

Timers T1 and T2 are normally open, and are started by closing their switch to apply current across the transformer V1 for a given time (different as between T1 and T2).

A timer T3 is also fed from the secondary of CVT2 and is connected to the primary of a voltage transformer TR3 of which the secondary is taken to a boundary flash light source. The "boundary flash" is not to be confused with the "flash exposure" or with the "no screen" exposure to which reference has previously been made. A boundary flash is a non-image bearing light of which the sole purpose is to produce an area of high opacity bordering the image produced by the enlarger on the photographic material. It does not affect in any way the quality of the image produced in the material and is indeed used when the portion of the photographic material which is to bear the image is masked to exclude light.

Starters for the timers T1, T2 and T3 are provided but are not shown.

A relay RL1/2 is a normally open two gang relay. It is actuated whenever power is applied across V1, so that its contacts RL1-1 and RL1-2 open the circuits containing the lamps 12 whenever the enlarger main light is on.

The output of the secondary of transformer CVT2 goes also to the primary of a constant voltage transformer CVT1. The secondary of this transformer gives a low voltage alternating current supply to the primary of a transformer TR2 and to a metal rectifier MR1 and also, through a semi-variable resistor R65 to lamps ILP1 and 1LP2 which are for illuminating meters M3 and M4 on the control panel (FIGURE 2).

The DC output from MR1 supplies two separate circuits containing the light-sensitive cells 7 of the probes 5 and 5'. These circuits are identical and only one will be described.

The secondary of the transformer TR2 supplies circuits which include the lamp 12 of the two probes 5 and 5'. Again, these circuits are identical and only one will be described.

Switches SA, SB and SD are ganged switches occurring in both these circuits for corresponding actions in each of them.

Dealing first with the adjustable circuit which includes the light-sensitive cell 7 of the probe 5, voltage is taken from one of four semi-variable potentiometers R9–R12 selected by gang $c$ of switch SB, and applied across one of four composite semi-variable potentiometers, each formed by a pair of semi-variable potentiometers R 53 to R60, selected by gang $f$ of switch SA. One of each pair is a coarse-adjustment, one a fine-adjustment, potentiometer. A volt meter M2 shows the voltage applied to the composite potentiometers.

In series with light-sensntive cell 7 is a micro-ammeter M4. The probe 5 is to be used in measuring highlight values of light and the meter M4 is of 50 millimicro-ammeter full-scale deflexion. (The meter M3 in the circuit of the cell 7 of probe 5' is however of 25 micro-ammeter full-scale deflexion.) A shunt across the meter M4 can be opened by opening of the gang $c$ of a spring biased two-gang switch SD, which is opened by depression of a button indicated at 18.

In the circuit which contains the lamp 12, the low voltage AC supply from the secondary transformer TR2 is led through relay contact RL1–1 and through one of four semi-variable potentiometers R13 to R16 selected by gang $d$ of switch SB, through one of four semi-variable resistors R61 to R64 selected by gang $e$ of switch SA, to the lamp 12.

The reason for providing semi-variable potentiometers R9 to R12 and R13 to R16, respectively, is the need for selecting an appropriate voltage range for working according to the size of enlargement being made.

The resistivity of a photo-resistive cell varies according to the light intensity at which it is working. The larger the enlargement, the lower the light intensity at the easel, for a given density of transparency. The resistivity of the cell would increase as light intensity decreased. But by applying a higher voltage across a cell of the photo-resistive type these variations can be to a large extent compensated for. The first step in setting up an enlarger is therefore for the operator to consult instructions provided with the enlarger and set switch SB at the position indicated for that size of enlargement and film speed to select a potentiometer from R9 to R12. Meter M2 provides a check that this has been correctly done but usually is used in setting up these potentiometers R9 to R12 for a given type of work, e.g. for a given film speed. The potential derived from that setting is applied across the composite potentiometer formed from potentiometers R53 to R60.

In the case of the circuit containing the lamp 12, the potentiometers R13 to R16 are set so that the voltage across the lamp 12 will be within a range which will give an illumination on the light-sensitive cell approximately equivalent to that which the cell will receive when it is placed on the easel and an enlargement is actually about to be produced.

Selection of a composite potentiometer from R53 to R60 and of a resistance from R61 to R64 is accomplished by switching of switch SA.

There are four positions of this switch in each gang, and these correspond to the four filter colours used in colour separation work. These are (usually) "white," blue, red and green. Each of these has a predominating wave length different from the predominating wave length of any other of the four. The sensitiivity of any light-sensitive cell varies according to the wave length of light falling on the cell. In order to be able to compensate for this and also in order to be able to bring density readings on the meter M4 to a single given value for all colours (this will be explained later) such potentiometers have to be insered selectively in the circuit including the cell. The corresponding adjustment to the amount of illumination given by the lamp 12 is accomplished by resistances R61 to R64. Also the sensitivity of the photographic material itself differs as between different wave lengths of light acting on it and the adjustment of potentiometers R53 to R60 takes this into account.

Switches SA and SB being ganged across the circuits of both probes 5, 5' produce corresponding changes in each.

The operation of te enlarger will now be described.

The basis of the operation of the enlarger is that for an exposure of a given size and in a certain colour a certain reading showing on the meter M4 after appropriate positioning of the probe 5 in an image on the easel will mean that a given density will be produced at that position in an image formed in photographic material subsequently exposed to that light for a pre-determined time and then subjected to a standard development procedure. This means that the meter can be calibrated directly in terms of density of a finished product for continuous tone work or, for example, in terms of integrated dot density or dot size when half-tone work is intended.

When two probes are used, the same considerations apply for each of the meters M3, M4, one reading the density at a shadow position, one at a highlight position.

A transparency is placed in the enlarger, the light source switched on and the probes 5, 5' placed respectively in highlight and shadow positions in the image formed at the easel.

The switches SA and SB are set to the indicated range and colour conditions and the means for setting the ratio of light intensity in flash and main exposures altered until the light intensities received at the highlight and shadow positions are at desired values as shown on meters M3 and M4. A trial run is then started. The light source of the enlarger is switched off, photographic material placed on the easel, the probes are removed and an exposure is given for a pre-determined time which preferably is an integral number of seconds, for example, 10, 20 or 40, and is preferably timed automatically, e.g. by timer T1 set to 10 seconds. T2 is set to about ½₀ of this for giving the "no screen" exposure, if necessary. After this exposure a standard development procedure is carried out on the photographic material and the density of the record thus prepared is determined at positions corresponding to those at which the probes were placed.

If the density at each of those places is that which is desired (a desired density is determined by prior knowledge of what will give the best results in reproduction) the enlarger is already correctly set up. But if the density departs in either case from what is needed the following procedure is undergone, being a procedure which allows the main light source to be calibrated without having to switch it on specially and (provided the cells are masked from outside light) without having to switch off the room lights. This is done by using the light source (12) which is specifically provided to illuminate the photo-cells as a standard calibrating light source. The procedure will be described with reference to one only of the probes 5 and 5': it is the same procedure for each, however.

The enlarger light source is switched off and the lamp 12 is switched on by the action of relay RL1/2 so that the lamp illuminates the cell 7 under the standard conditions. The resistance R61 to R64 which is at that time in circuit is adjusted (from the control panel 4) until the amount of light emitted from the lamp 12 and received by the cell 7 is such that the meter M4 gives a reading which is exactly that which is desired. It is to be remembered that the meter dial reads directly in terms of density.

Then, while the lamp 12 remains on, and the meter M4 is in circuit, the switch SD being held open, the appropriate composite potentiometer R53 to R60 in the circuit of the cell 7 is adjusted so that now the reading in the meter M4 becomes that which corresponds to the density which was actually obtained in the finished trial record.

To take a specific example, if it is known that for a highlight position the density desired is 1.5 in density units, and the actual density measured on testing the trial material was 1.4, firstly the resistance R61 to R64 is adjusted so that the light from the lamp 12 illuminates the cell 7 so that that gives a reading of 1.5 on the meter M4 and then the potentiometer R53 to R60 is adjusted so that the reading on the meter M4 is restored to being 1.4 (the condition of the lamp 12 remaining of course completely unchanged during this second stage).

If the reading obtained by the test material (1.4 in the specific example) was outside the tolerance which would be allowed for this particular piece of work a second trial exposure from the transparency is made in the manner described above, the density of the product is measured and the same adjustment procedures are gone through. If, however the trial reading on the first trial was within the tolerance allowed for that work, no further adjustment in the probe circuit is necessary before a working exposure is made.

Then a like calibration procedure is carried out with the other of the probes: and the calibration of each meter is repeated, when initially setting up the enlarger for each enlargement size-range and each colour.

The final step in every case is to operate the appropriate timer so that the enlarger light source is switched on and simultaneously the probe lamps 12 are switched off by the relay RL1/2.

The light intensity received at the easel from the enlarger light is read on meters M3 and M4 by opening switch SD. This intensity is adjusted by adjustment of the variable transformer V1 and of the means controlling the flash/main exposure intensity ratio so that the meters M3 and M4 both give exactly the desired reading on their scale, the probes 5, 5' being of course in the same position as they were in previously. The result is that using the main light source in its adjusted condition for a given time to make an exposure, and using the same standard development procedure as before a record will be produced which has the correct densities over its whole range of contrast, within very close limits.

The resistors and potentiometers are set so that when the variable transformer V1 is adjusted so that the enlarger light source gives desired intensities, as measured by the meters, at the easel the standard exposure time is an integral number of seconds. In that this light intensity to produce a given density is the primary variable, the potentiometers R9 to R12 and R13 to R16 are adjusted in the factory, before the enlarger is sent out, so that they will cause in the meter calibration circuit a condition which will involve production, after the adjustment process which has been described, of that intensity of light at the easel which will need an integral number of seconds exposure.

Since all transparencies in graphic arts works are prepared with their highlight and shadow parts coming within a desired range of density contrast, it should be possible to work the enlarger for some time on different transparencies without further calibration of the meters. All that should be necessary, after switching switches SA and SB to the appropriate size and colour ranges, and placing the probes in the highlight and shadow positions, should be to check before each enlargement by depressing the knob 18 to open the switches SD, which has the effect of bringing the meters M3 and M4 into circuit so that the reading obtained by the cell 7 derives solely from the enlarger light source, and adjusting the intensity of that source and/or the main/flash exposure ratio so that the desired readings are given on the meters.

The method described has the advantage that the light sources 12 are by definition adjusted to give cell 7 the same amount of illumination as will be received from the enlarger light source; thus rise-time should be zero. Also, by occasional checking of the results of working exposures and re-calibration of the meters when any drift is observed, the intensity at which these lamps 12 illuminate the cell and that at which the enlarger as a whole works are corrected. This checking will compensate also for any drifts occurring during the development stage, or slight speed variations as between different batches of photographic material, as well as other variables.

It is possible to eliminate the meters M3, M4 and substitute a current-sensitive bridge device causing through a servomechanism, the appropriate adjustments in the circuitry.

As has been mentioned, the invention is applicable to monochrome work, to enlargers where light for flash and main exposures derive from different sources, to enlargers wherein the light 12 illuminating the cells is not actually housed in the probe but is fixed to a part of the enlarger to illuminate the cell when it is not in use, and to enlargers where only one probe is used. In these cases modifications of or omissions from the circuitry which has been specifically described may be permissible or even essential; but the nature of these modifications or omissions should be apparent to all skilled in this art, now that one embodiment of enlarger and of method within the invention have been fully described and explained.

It also is applicable to electronic scanners used in preparing colour operation materials, particularly when they are used for colour correction.

I claim:

1. Apparatus for controlling the intensity of an image-projecting exposure light in photographic apparatus having a first light source of adjustable intensity for projecting and exposing an image on photographic material on a support surface, said apparatus comprising a light-sensitive photo-resistive electric cell adapted to be temporarily placed on said support surface for receiving light projected thereon from said first light source, a current sensitive element for indicating the intensity of light received by said cell as a function of the current in an electric circuit through the cell, means for varying the resistance of the circuit through the cell for calibrating the current sensitive element, and a second light source of adjustable intensity adapted for directing light therefrom to the cell, said first and second light sources being adapted to be operated alternatively, whereby the second light source is adapted to supply light to the cell at the same intensity as a prior test exposure from the first light source in order to calibrate the current sensitive element for an adjustment of the intensity of the light subsequently to be applied from the first source.

2. Apparatus according to claim 1 wherein said means for varying the resistance of the circuit through the cell is an array of resistance-varying elements each adapted to be selectively included in said circuit.

3. Apparatus according to claim 1 wherein said means for varying the resistance of the circuit through the cell is provided by two arrays of resistance-varying elements and means for connecting a selected element from each array in said circuit.

4. Apparatus according to claim 1 including a second photoelectric cell, a second current sensitive element connected for indicating the amount of light received by said cell as a function of the current in an electric circuit through said second cell, and means for varying the resistance of the latter circuit through the second cell for calibrating said second current sensitive element.

5. Apparatus according to claim 4 wherein said first light source is adapted to apply both a main exposure and a flash exposure to photographic material on said support surface.

6. Apparatus according to claim 1 wherein said current sensitive element is an ammeter adapted to be read directly in values of density for photographic material that has been exposed by light from said first source and developed by a given development process.

7. Apparatus according to claim 1 including switch means for automatically switching one of the first and second light sources off and at the same time switching the other on.

8. A method of calibrating the intensity of light in photographic apparatus for reproducing an image, having a desired degree of density at a selected portion thereof, on photographic material by light from an image-projecting exposure light source of variable intensity comprising making a test exposure by projecting said image onto photographic material for a given time with light from said source at a degree of intensity which should produce the desired degree of density at said portion, measuring the intensity of light at said portion with a light-sensitive photo-resistive electric cell by measuring the amount of current produced through the cell by said light, developing the photographic material and comparing the actual degree of density at said portion with the degree of density desired, then, after shutting off the light from said exposure light source, applying light from another source of adjustable intensity light to the cell and adjusting the intensity of this latter light until the measurement of the amount of current produced through the cell by this latter light is substantially the same as the amount of current that would be produced therein by the degree of intensity of light which would be required to produce the desired degree of density at said portion of the image as determined by said comparison of said actual with said desired degree of density and, if necessary, varying the resistance of the circuit through said cell to adjust the amount of current which is produced therein by light of said required intensity to be the same as the amount of current that was produced therein by the light applied from said exposure source for the test exposure.

9. A method according to claim 8 wherein for each test exposure the intensity of light is measured and calibrated both at a light and at a dark portion of said projected image with separate light-sensitive photo-resistive electric cells by measuring the amounts of current produced through the respective cells by said light, and thereafter applying light from two other sources respectively to the cells for determining the degree of light intensity change that may be required at said portions and, if necessary, varying the resistance of the circuits through the respective cells to duplicate the amounts of current produced therein by the test exposure.

10. A method according to claim 8 including the additional subsequent step of shutting off the light from said other source and adjusting the intensity of the exposure light source until the amount of current thereby produced through the cell equals the amount of current produced in the cell by the light applied from the exposure light source for the test exposure.

References Cited

UNITED STATES PATENTS 3,056,332  10/1962  Beregowitz _____ 355—68 X
3,222,983  12/1965  Ouchi _____ 355—68 X JOHN M. HORAN, Primary Examiner RICHARD A. WINTERCORN, Assistant Examiner U.S. Cl. X.R.

356—222, 226, 228, 230